Nov. 13, 1951     F. M. GALLOWAY     2,574,555
APPARATUS FOR MAKING MULTIPLE PLY EXTRUDED HOSE
Filed Dec. 2, 1949
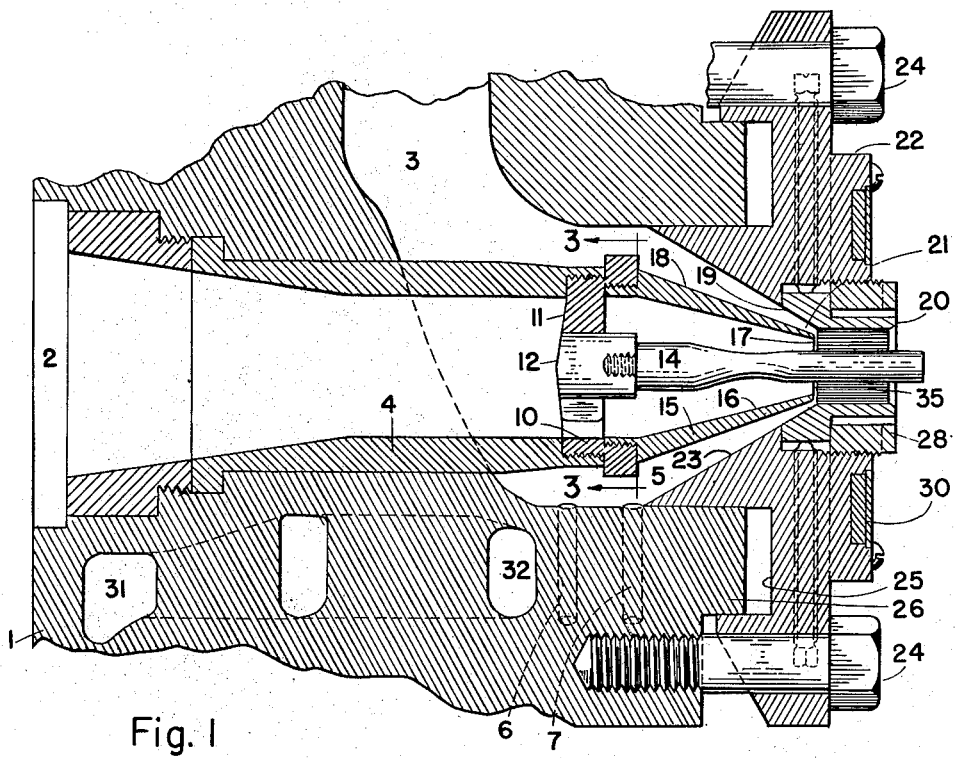
Fig. 1
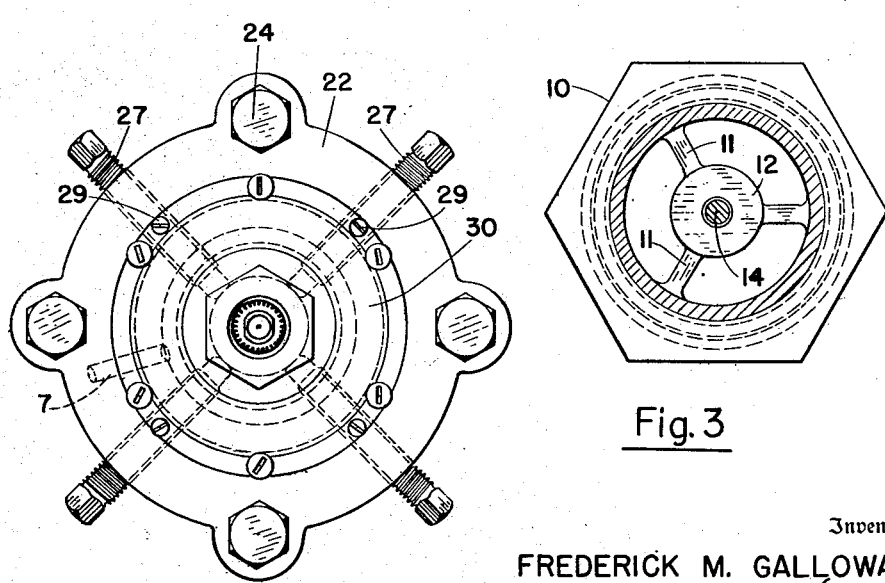
Fig. 2
Fig. 3
Inventor
FREDERICK M. GALLOWAY
By
Attorney Patented Nov. 13, 1951

2,574,555

UNITED STATES PATENT OFFICE 2,574,555

APPARATUS FOR MAKING MULTIPLE PLY EXTRUDED HOSE

Frederick M. Galloway, Langhorne, Pa., assignor to Quaker Rubber Corporation, Philadelphia, Pa., a corporation of Pennsylvania Application December 2, 1949, Serial No. 130,689

2 Claims. (Cl. 18—14)

1

This invention relates to the manufacture of double-walled tubing, hose or the like and is particularly directed to extrusion of plastic materials such as rubber compositions in concentric tubular layers forming a composite tube or hose in which the interior layer may be formed from one composition and the outer layer from another. Thus, for example, in the manufacture of garden hose and the like an inner layer may be made from black rubber composition and the outer one from a composition of different color affording a pleasing visual effect while retaining all the service qualities of the black composition in the main body of the hose.

It has been the practice in the manufacture of hose comprising layers of different composition or color to employ a fabric layer impregnated with rubber composition for the main body of the hose and to apply to the exterior thereof a layer of distinctively colored rubber composition but it has been impractical to produce hose of this character with its inner bore sufficiently smooth to avoid offering undue resistance to the passage of fluids while the expense involved in making the hose renders its cost prohibitive compared with that of all rubber hose which may be extruded in a continuous process with the aid of known apparatus adapted to impart a smooth finish to the hose bore. However, in the manufacture of hose of the latter type it has been necessary to employ only a single composition and efforts to provide an attractively colored outer layer have been unsuccessful since suitably colored compositions are devoid of certain of the properties of black rubber.

In accordance with the present invention, however, there may be produced a continuous hose comprising an inner layer of composition providing the desired physical properties and an outer layer of another composition intimately united with the inner layer but having other properties such for example as a distinctive and different color.

It is therefore a principal object of the invention to provide apparatus and a method for simultaneously extruding concentric tubes of rubber or generally comparable compositions but of different specific character and at the zone of extrusion uniting the inner and outer layers together in a single composite tube which after further treatment in accordance with known practices may be employed as garden hose or for generally similar purpose.

A further object is to provide an extruding

2 head of novel form for a hose manufacturing machine which is provided with mechanism for assuring precise concentricity of the several extruded layers whereby the wall thickness of the outer layer is made uniform circumferentially and is securely and continuously bonded at its inner surface to the outer surface of the inner layer.

Other objects, purposes and advantages of the invention will hereafter more fully appear or will be understood from the following description of a preferred embodiment of the said apparatus illustrated in the accompanying drawing, in which Fig. 1 is a fragmentary horizontal axial section showing an extruding head constructed in accordance with the invention, Fig. 2 on a smaller scale is a fragmentary front elevation of the head and certain associated parts, and Fig. 3 is a fragmentary transverse section on the line 3—3 in Fig. 1.

Referring now more particularly to the drawing, a housing 1 fragmentarily illustrated therein is provided with a bore 2 and an inlet passage 3 the axis of which extends approximately normal to that of the bore, both the bore and the passage terminating at a substantially cylindrical chamber 5 within the housing. Seated in bore 2 and projecting therefrom into the chamber is a sleeve or conduit 4 through which is passed the rubber composition utilized to produce the inner layer of the hose while the radially disposed passage 3 communicates directly with the chamber externally of the conduit and conducts into the former the composition which produces the outer layer and it will of course be understood that the outer ends of the conduit and passage are respectively connected to feeding mechanisms adapted to deliver under adequate pressure the plastic stock used for forming the said inner and outer layers.

At points substantially diametrically opposite passage 3 are a pair of relatively small bleeder ports 6, 7 through which a small proportion of the composition entering chamber 5 through passage 3 is continuously ejected to assist in maintaining circumferential uniformity in the flow of stock axially of the chamber.

An extrusion head is secured to the forward end of the conduit 4 and comprises a threaded bushing 10 within which a plurality of "streamlined" spider legs 11 support a stud 12 coaxial with the bushing and threaded internally at its forward end for the reception of the externally threaded end of a spindle 14. The latter is thus supported coaxially with the bushing and extends forwardly therefrom to a point a short distance beyond the front of housing 1. The bushing 10 also supports a conical extrusion die 15 the internal conical surface 16 of which is concentric with the spindle 14 and provides therewith an annular extrusion port 17 through which rubber composition may be ejected in tubular form along the spindle and beyond its end when supplied under adequate pressure through the conduit 4.

The exterior conical surface 18 of the die 15 which is substantially continuous with the adjacent outer surface of the bushing 10 and hence of the conduit 4 also forms a portion of the inner confining wall of the annular chamber 5 which receives rubber composition from the passage 3 and at its forward end this surface 18 of the die is cooperative with a concentric inner surface 19 of an outer bushing 20 cooperating therewith to form an annular extrusion port 21 through which the outer layer of the composite tube is ejected from said annular chamber.

The outer bushing 20 is adjustably supported in a face plate 22 having a frusto-conical concave surface 23 continuous with inner surface 19 of the bushing and adapted to be secured to the front end face of the housing 1 with the aid of bolts 24, the plate having an annular recess 25 cooperative with a complementary rib 26 on the housing to maintain substantial concentricity of the plate with the extrusion ports 17 and 21 and by adjustment of the bolts 24 to control the axial clearance between the bushing 20 and die 15 and thereby regulate the wall thickness of the outer layer of the tube extruded through port 21.

The outer bushing 20 is supported in the plate 22 from a plurality of radially directed screws 27 which may be adjusted to permit limited transverse movement of the bushing and thereby insure its concentricity with the head, while a locking bushing 28 threaded into the plate and preferably set up against the outer bushing before the adjustment clamps the outer bushing in place axially, set screws 29 fixing the positions of screws 27.

Means attached to the front face of the plate 22 are provided for heating the latter and adjacent parts to operative temperature at the beginning of a run, said means comprising an annular electrical unit 30 containing a heating coil of resistance wire adapted for connection to a source of current through suitable conductors (not shown).

In manufacturing two color hose with the aid of this apparatus, the heating unit is energized to bring the extruding head and associated parts to approximately extruding temperature, for example 180° F. or thereabouts, the means for feeding the rubber stock set in motion and the stock, preferably in the form of strips of rubber composition at suitable working temperature, fed thereto for passage to the extrusion head. The additional working of the stock incident to its being fed by the feeding means through the housing passages and the extruding chambers normally generates heat more than sufficient to maintain the composition in a condition having many of the characteristics of a fluid suitable for extrusion through the extruding ports; passages 31, 32 in the housing 1 are therefore desirably provided for circulation of a coolant to remove the excess heat.

Preferably after all the composition spaces in the housing and the head have been filled with the respective compositions and extrusion of the stock has been initiated the spacing of the face plate from the extrusion die and concentricity of the outer bushing with the latter are adjusted to produce the desired effects and set screws 29 then set up to secure the adjustments. Continuous operation of the feeding means to feed rubber compositions into the housing thereafter maintains a continuous extrusion of the composite tube which may be conducted on a suitable belt conveyor or the like (not shown) to a run out table where after being cut in sections it may be introduced to a vulcanizing chamber if a composition requiring vulcanizing is being employed, the tube preferably being fed through a soap solution bath between the extrusion head and the conveyor to prevent it from sticking to the latter.

In the practice of the invention an extrusion rate in the neighborhood of 50 feet per minute of composite rubber tubing of approximately ½ inch inside diameter and of wall thickness appropriate for use as garden hose is readily attained and so long as a continuous feed of stock is maintained the length of single pieces of hose which may be produced is limited only by the equipment available for handling it in subsequent treatments such as vulcanizing or the like.

It will be appreciated that while the mechanism herein shown and described is especially adapted for making hose of the type generally referred to as garden hose, in the manufacture of which it is customary to provide by means of parallel flutings 35 in the outer extrusion bushing 20 corresponding grooves and ridges in the outer surface of the finished hose, these flutings may be of any appropriate character or may be omitted, if desired, while the relative size of the various parts may of course be modified to correspond to hose of larger or smaller bore and/or wall thickness beyond the limits of adjustability provided in the mechanism illustrated. Moreover while the outer layer of the hose, which is preferably of a distinctive color different from that of the inner layer, is generally of less thickness than the latter the relative thickness of the layers is a matter of choice and in some instances it may be preferable to produce hose in which the outer layer is thicker than the inner one or of the same thickness; the specific compositions employed in the respective layers are likewise subject to appropriate modification in accordance with the discretion of the manufacturer.

While I have herein described one embodiment of the invention with considerable particularity as well as a method I employ for making hose together with certain modifications which may be adopted, it will be understood I do not desire thereby to limit or confine myself in any way as other changes and modifications in the form, construction, and relationhsip of the parts of the apparatus and in said method will readily occur to those skilled in the art and may be made if desired without departing from the spirit and scope of the invention as defined in the appended claims.

Having thus described my invention, I claim and desire to protect by Letters Patent of the United States:

1. Apparatus of the class described comprising a housing providing a substantially cylindrical chamber, a bore coaxial with the chamber, an inlet passage directed radially into and a substantially diametrically opposed bleeder port leading from the chamber, a sleeve disposed in the bore and projecting therefrom into the chamber, a die carried by said sleeve providing converging coaxial inner and outer frusto-conical surfaces, a substantially cylindrical spindle extending axially within the die and projecting beyond its smaller end, means extending radially inwardly from the sleeve supporting the spindle and providing passages for the flow of plastic material from the interior of the sleeve through the die, a bushing having a frusto-conical inner surface surrounding and spaced from the smaller end of the die and a substantially cylindrical surface surrounding the projecting portion of the spindle, a plate having an aperture receiving the bushing and a frusto-conical surface substantially continuous with the frusto-conical surface of the bushing and extending therefrom into the chamber in diverging spaced relation to the outer surface of the die, means including a plurality of circumferentially spaced radially directed positioning elements engaging the bushing and adapted for radial movement toward and away from the axis of the plate to thereby adjustably support the bushing in predetermined relation to the die, locking means for clamping the bushing in said relation and means supporting the plate for axial movement relatively to the housing including a plurality of spaced tension elements extending through the plate and into the housing, said plate having an annular groove adapted for reception of an annular projection on the housing coaxial with said chamber and providing cylindrical surfaces respectively substantially coincident with the inner and outer surfaces of said groove, the inner annular surface of said projection being substantially continuous with said chamber.

2. Apparatus of the class described comprising a housing providing an outer plane surface, a substantially cylindrical chamber within the housing terminating at said surface, an inlet passage communicating through the housing with and extending substantially radially to the chamber, a bore of smaller diameter than the chamber extending in coaxial relation therewith in the housing substantially to the junction of the inlet passage and chamber and a bleeder passage leading from the chamber opposite said inlet passage and a cylindrical surface adjacent said plane surface coaxial with the chamber and radially spaced therefrom, a plate overlying said plane surface and the adjacent end of the chamber having an aperture and an annular groove outwardly thereof the inner and outer walls of which respectively engage the inner wall of the chamber and said cylindrical surface of the housing, means for adjustably positioning the plate axially relative to the housing, a bushing in said aperture, means operable to move the bushing transversely therein, means for clamping the bushing axially in the aperture, said plate and said bushing providing complementary concave surfaces cooperatively defining a substantially conic frustum terminating at its reduced end at a substantially cylindrical extrusion passage through the bushing, a sleeve disposed in said bore, extending therefrom into the chamber and forming a substantially cylindrical conduit, a die carried by said sleeve providing coaxial inner and outer substantially frusto-conical surfaces converging toward said extrusion passage, said outer frusto-conical surface cooperating with the concave bushing surface to define a substantially annular extrusion port for material introduced to the chamber through said inlet passage during extrusion of part of said material through said bleeder port, a substantially cylindrical spindle extending through the bushing supported from said sleeve and cooperative with said inner frusto-conical surface of the die to define a second substantially annular extrusion port generally aligned with said first extrusion port and adapted for extrusion of material passing through said sleeve, and means for supporting the die and spindle from said sleeve comprising an internally and externally threaded bushing having integral radially extending legs and an axial boss having a rigid connection with the spindle.

FREDERICK M. GALLOWAY.

REFERENCES CITED

The following references are of record in the file of this patent:

UNITED STATES PATENTS

| Number | Name | Date |
| --- | --- | --- |
| 441,808 | Royle et al. | Dec. 2, 1890 |
| 830,201 | Blondel | Sept. 4, 1906 |
| 1,637,207 | Whitehouse | July 26, 1927 |
| 1,959,460 | Crossan | May 22, 1934 |
| 2,105,812 | Gordon et al. | Jan. 18, 1938 |